(12) United States Patent
Torre

(10) Patent No.: US 6,283,487 B1
(45) Date of Patent: Sep. 4, 2001

(54) PARALLELOGRAM BICYCLE SUSPENSION SYSTEM

(76) Inventor: Robert Torre, P.O. Box 1381, Vancouver, WA (US) 98666

( * ) Notice: Subject to any disclaimer, the term of this patent is extended or adjusted under 35 U.S.C. 154(b) by 0 days.

(21) Appl. No.: 09/557,304

(22) Filed: Apr. 25, 2000

(51) Int. Cl.⁷ .................................................. B62K 25/04
(52) U.S. Cl. ............................................................ 280/283
(58) Field of Search .................................. 280/283, 284, 280/285, 286

(56) References Cited

U.S. PATENT DOCUMENTS

| | | | |
|---|---|---|---|
| 4,058,181 | * 11/1977 | Buell | 180/227 |
| 4,114,918 | * 9/1978 | Lutz | 280/284 |
| 4,463,824 | * 8/1984 | Boyesen | 180/227 |
| 4,627,632 | * 12/1986 | McKagen | 280/276 |
| 4,723,620 | * 2/1988 | Ono | 180/219 |
| 4,951,791 | * 8/1990 | Creixelli | 180/219 |
| 5,156,231 | * 10/1992 | Trema | 180/227 |
| 6,139,039 | * 10/2000 | Becker | 280/283 |

* cited by examiner

Primary Examiner—Kevin Hurley

(57) ABSTRACT

The parallelogram suspension system can be used for both the front and rear wheels of a bicycle, individually or together. A rear parallelogram suspension system will absorb less propulsive energy than most large travel rear suspension systems, while offering greater travel and better adjustability than "pivotless" rear suspension systems. A front parallelogram suspension system will move in constant geometric alignment to the main frame of the bicycle, can have no play in the fore/aft or lateral directions, and can have no stiction, all characteristics that will give the bicycle better handling and control compared to the common telescopically compressing suspension fork. Front parallelogram suspensions will also have a much lower mass than these suspension forks, both in total mass and in moving mass. It would be possible to construct a fully suspended bicycle frame that utilizes only one shock and/or spring unit, thus saving weight over fully suspended designs that use separate shock and/or spring units for each wheel. A parallelogram suspension system, for either the front or rear of the bicycle, can be designed and constructed to allow expedient shock, spring, ride height and suspension travel adjustments, thus allowing a bicycle to be quickly optimized for different riders, terrain's and riding styles, and will also allow maintenance to be simple and quickly done.

3 Claims, 3 Drawing Sheets

PARALLELOGRAM BICYCLE SUSPENSION SYSTEM

BACKGROUND OF THE INVENTION

It has become popular for many designs of the common safety bicycle to use suspension systems, mainly designs of the 'mountain bicycle'. Present suspension systems used on these bicycles have technical difficulties in achieving light weight systems that do not have problems that affect the bicycle's performance. Many of the current front and rear suspension systems do not allow adjustment for optimizing the bicycle for different terrain's, and those that do require a long down time to perform these adjustments. Most front suspensions are also difficult to maintain.

The problems for most bicycle suspension systems stem from the fact that they are essentially modified motorcycle suspensions. Common front suspension designs that use telescopically compressing cylinders do not maintain accurate geometric alignment of the front wheel during suspension travel. These suspension systems also typically have poor lateral and fore/aft stiffness, that is they allow 'slop' in the system, and have initial stiction to overcome in handling small irregularities, all problems that degrade performance. These front suspension systems also need to be adjusted for the riders size and style of riding, or they can perform badly. Many front suspension designs require regular maintenance. Adjusting and maintaining these front suspensions can be very time consuming, since the system has to be completely disassembled, and most require special tools and knowledge to do so. Also, since these types of suspensions use multiple redundant tubes that slide in and around each other, they have a large amount of redundant weight.

Rear suspension systems in use today that use motorcycle style swing arms, while allowing a large amount of rear wheel travel, deprive the bicycle of propulsive energy. The systems that do not use a motorcycle style swing arm concept, commonly called "pivotless" suspensions, do not absorb much of the propulsive energy, but they do not allow a large amount of rear wheel travel. Present rear swing arm style suspensions also tend to add a great deal of weight to the bicycle frame, in the form of redundant frame members, and linkage members that are not part of the suspension system but are needed to go around sections of the bicycle frame to connect the suspension to the frame.

Rear suspensions that use the motorcycle swing arm concept are typically influenced by drive torque, thus they absorb the propulsive energy. There are several variations that are presently in use, some absorb power at all times, some absorb more power while the rider is seated, some absorb more power when the rider is sprinting, or climbing, and is out of the saddle.

Rear bicycle suspensions that do not use a motorcycle style swing arm design usually have curved and/or sprung seat stays, and chain stay's that do not pivot on bearing assemblies. These are commonly called "pivotless" suspension systems. This style of rear suspension does not greatly absorb the propulsive energy intended for the rear wheel, however, they do not allow large amounts of rear wheel travel and usually cannot be adjusted for ride height and/or shock and spring rates.

The inventor observed that, while the concepts of bicycle suspensions and fully suspended bicycles, do have their merits, the technical difficulties that degrade the overall performance of the common suspension systems used in bicycles needed to be overcome. Improved suspension systems needed to be designed for the bicycle, that will solve the problems that plague current bicycle suspension designs, lower the complexity and weight of the suspension systems, increase the functionality, and simplify the serviceability and adjustability. An improved rear bicycle suspension needed to be developed that would reduce the drive power absorbed while allowing a large amount of rear wheel travel, and a front suspension system needed to be developed that would decrease the weight, and eliminate the stiction and alignment problems, of the common telescopically compressing cylinder suspension forks.

The suspension systems envisioned by the inventor use a parallelogram design concept that will allow a large amount of travel for both the front and rear wheels, lower the number of suspension members, compared to many common suspension systems, and increase the reliability and simplicity of maintenance and adjustment. The parallelogram suspension system will allow a filly suspended bicycle to weigh very close, if not equal, to the weight of a non-suspended bicycle. A parallelogram suspension system can be used on the front or rear wheels individually or together, on a safety bicycle, recumbent bicycle, tandem bicycle, tricycle, and any other type of presently existing and yet to be developed human powered vehicle. The only absolute requirement for a parallelogram suspension system is that it uses at least two main suspension members with the centers of the fore and aft pivot points aligned in a geometric parallelogram.

Parallelogram suspension systems will improve front wheel performance over current designs, will allow the rear wheel to ride over surface abnormalities with little affect on the propulsive energy being transmitted to the rear wheel, will allow a bicycle to be fully suspended using only one shock and spring sub-assembly unit for both wheels, and can allow any suspension system to be quickly and fully adjusted for spring rate, shock rate, ride height and suspension travel, thus allowing the bicycle to be optimized for different riders, terrain's, and riding situations.

Front suspensions made with a parallelogram design will not suffer from geometric alignment changes when the wheel transverses over surface irregularities or when the ride height is changed, can use a single low maintenance shock and spring unit rather than multiple compression units, and will not suffer from looseness or stiction, all problems with the common telescopic compression style of suspension fork. A parallelogram front suspension design can weigh the same as a similar non-suspended design, except for the weight of the shock and spring members, and will make it possible to use weight saving carbon-fiber forks and tubes, and other such weight saving improvements, thus making it possible to have a front suspension system weigh very close to a non-suspended front fork.

BRIEF SUMMARY OF THE INVENTION

A parallelogram suspension system can be used for both the front and rear wheels of a safety bicycle, or other human powered vehicle. The preferred embodiment of the design is a fully suspended mountain bicycle. A bicycle frame can be made with a parallelogram suspension for the front or rear wheels individually, or both the front and rear wheels together. The necessity of any design that uses this concept is that the suspension system, whether front or rear, has at least two horizontal and two vertical suspension members, with at least four main pivot points. Each horizontal member has a pivot point at the end that supports the wheel at one of the vertical members, and a pivot point at the end that connects to the main frame, the other vertical member. The four main pivot points are arranged in such a manner that lines connecting the center points form a four sided polygon that is a parallelogram.

A rear suspension using the parallelogram design concept must make sure that the halves of the horizontal suspension members on each side of the frame are in perfect alignment, when viewed from a side profile, if the suspension system uses individual halves to form one suspension member or arm. It would be advantageous to use one piece 'H' style arms for the rear horizontal members, thus simplifying the structure of the rear suspension, and giving the suspension greater lateral strength. The rear suspension will have a dropout member on each side, where the rear wheel's axle will attach, similar to all present bicycle frames. For optimal power transfer, the vertical axis of the suspension pivots at the frame should line up with the center of the bottom bracket, and the vertical axis of the suspension pivots at the wheel should line up with the center of the wheel's axle. This alignment will insure that the chain moves in alignment with the suspension, thus minimizing drive power absorption and drive train induced suspension motion.

A front suspension using the parallelogram design concept can be formed in many ways. It's main members are the nearly vertical head tube and the main frame of the bicycle, and two nearly horizontal members. The head tube uses conventional means for the front fork to attach. The place where the horizontal suspension members attach to the bicycle frame could be the seat tube, or it could be a "suspension anchor tube". The horizontal suspension members could be an adaptation of the down tube and top tube of a typical bicycle frame, running from the head tube all the way to the seat tube. If a suspension anchor tube is used, the front triangle is made with a top tube and a down tube that are shorter than usual, thus making the front triangle small, which ends at the suspension anchor tube instead of the standard head tube. The suspension anchor tube is located near enough to the seat tube to give room for the front suspension. The two horizontal suspension members attach from the head tube to the suspension anchor tube.

A front parallelogram suspension system will keep the front wheel's geometric alignment to the frame constant over it's full range of travel. This type of front suspension can also have no fore/aft or lateral play, or initial stiction, if high quality bearings are used at the pivot points, thus optimizing front suspension performance under all circumstances. It is envisioned that with a parallelogram suspension on the front of a safety bicycle, it would be advantageous to have a handlebar stem that provides some type of sprung connection to absorb the shock from the front wheel and relieve the rider, since the handlebar will move with the front wheel.

On a fully suspended bicycle, individual shock and spring members could be used for each wheel, or only one shock and spring member could be used to suspend both wheels. The placement and arrangement of the shock and spring members are subject to the needs of the particular design. It would be advantageous to have the shock and spring members combined into a single sub-assembly unit, as is common for present rear suspension systems, thus allowing for easier connection and serviceability. If only one shock/spring unit is used in a fully suspended design, it would connect in a way that would excerpt downward pressure on each wheel, thus causing the frame to have upward lift.

A parallelogram suspension system can use various means of travel limiting, and these limits could be made to be quickly adjustable. Travel limiting concepts of the parallelogram suspension system have such a multitude of possibilities that none are considered optimal, the possibilities that exist will be know to those skilled in the art of suspended bicycle frame construction

BRIEF DESCRIPTION OF THE VIEWS

The views of the preferred embodiment of the parallelogram bicycle suspension system on a fully suspended safety bicycle frame, and some of it's members, and of individual front and rear parallelogram suspension systems on a safety bicycle frame, are shown in FIGS. 1 through 8, and given brief descriptions:

Figure 1:
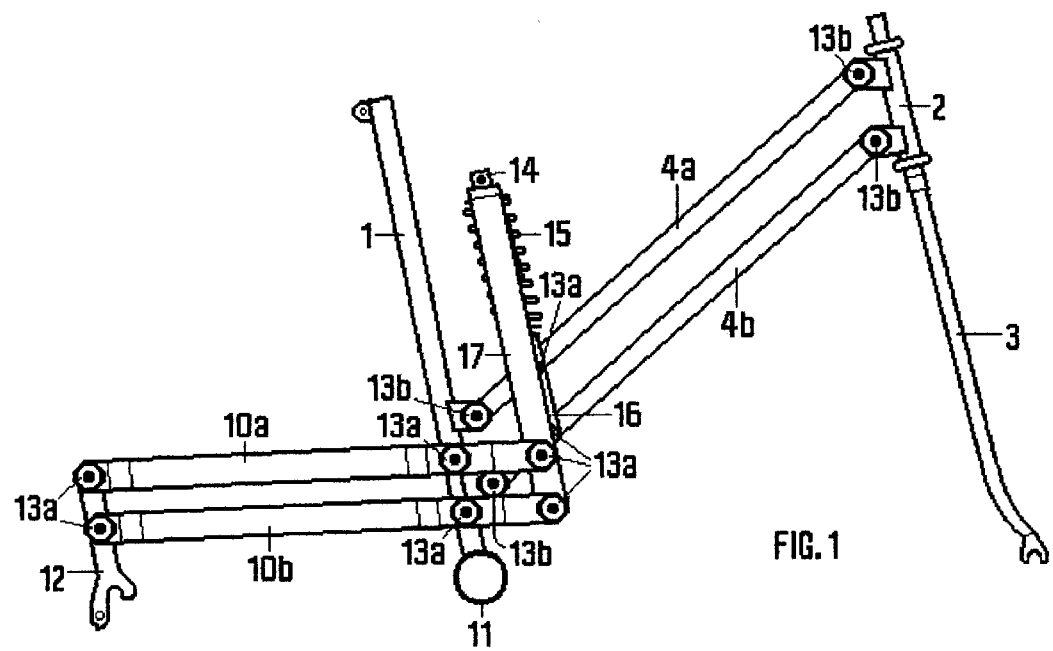
FIG. 1 is a side elevational view of a fully suspended safety bicycle frame that uses a single shock/spring sub-assembly unit to suspend the bicycle, this is the preferred embodiment of the parallelogram suspension system.
Figure 4:
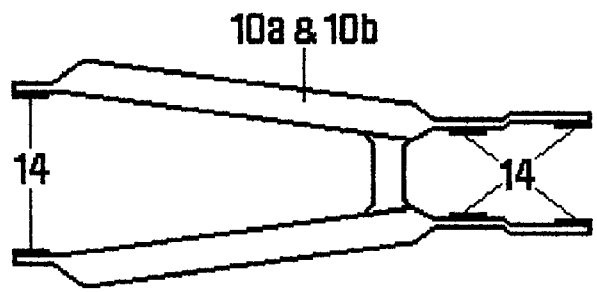
Figure 5:
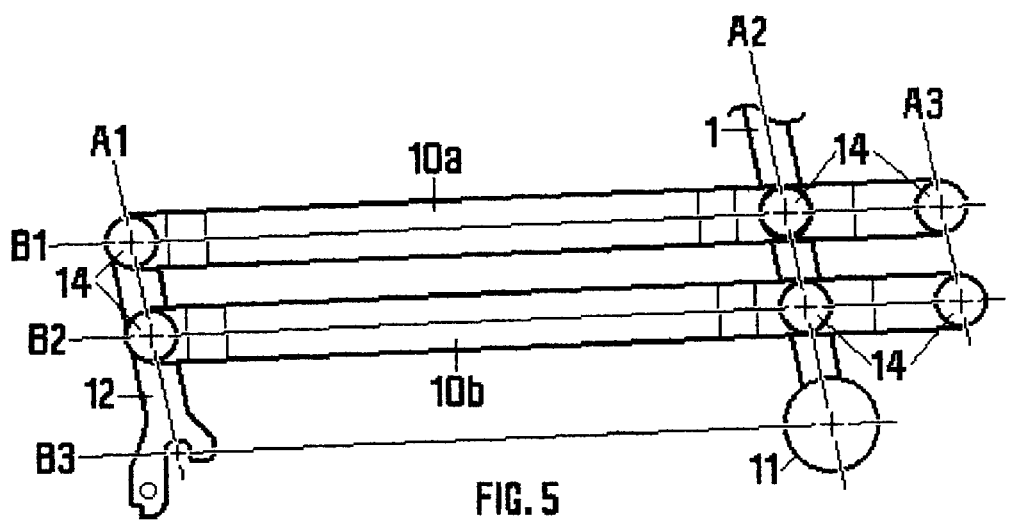
Figure 6:
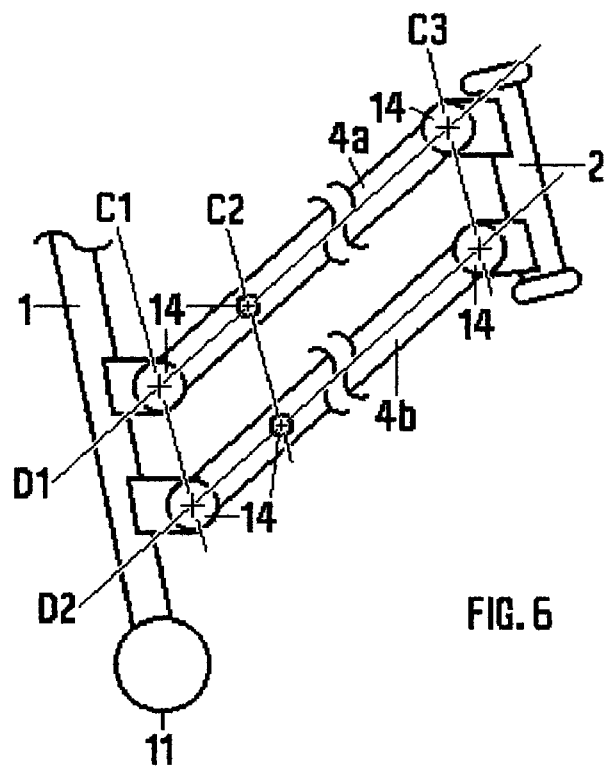
Figure 7:
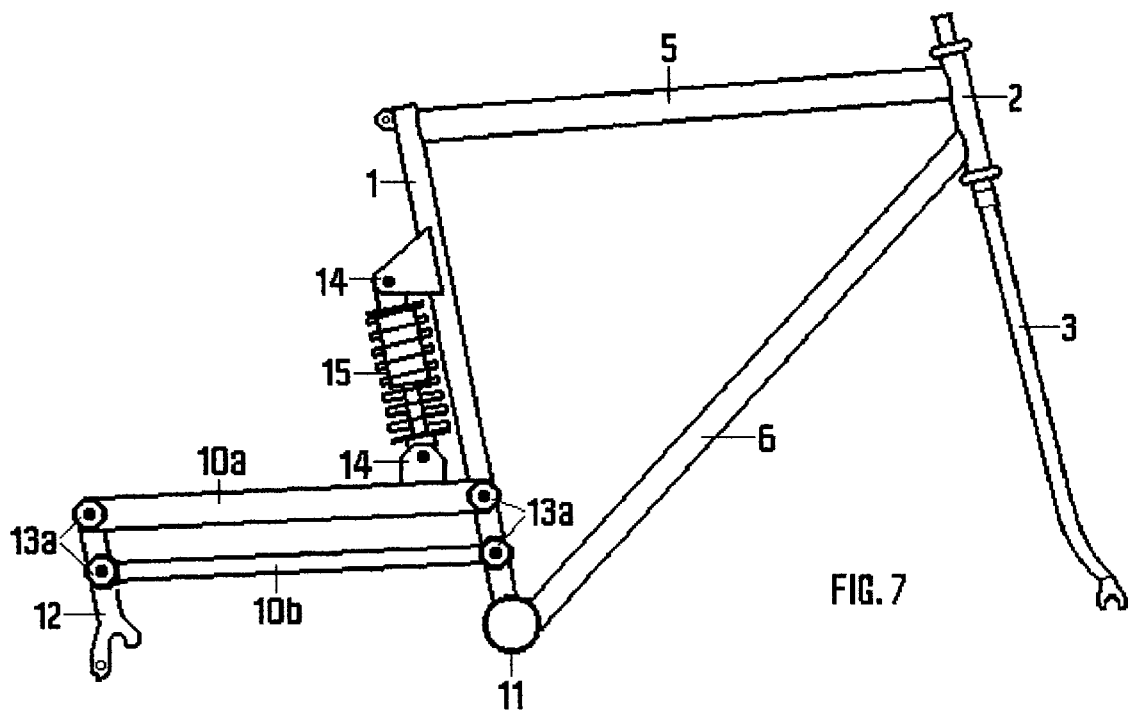
Figure 8:
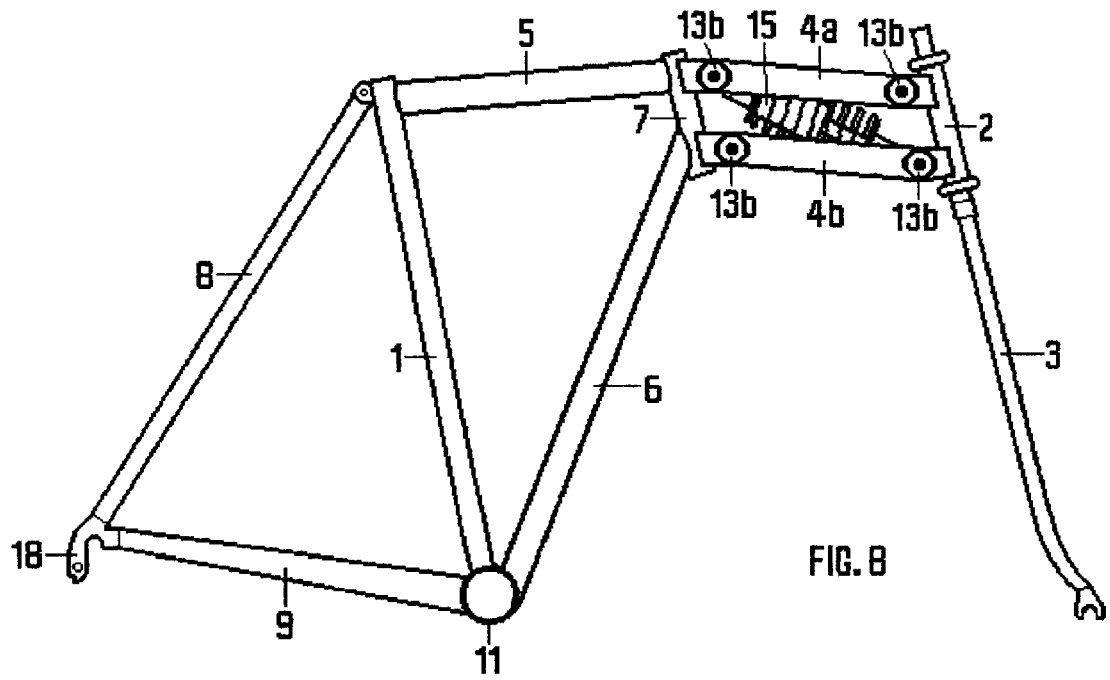

FIG. 4 it a top plan view of either one of the rear suspension arms used in FIG. 1, both arms being identical;

FIG. 5 is an enlarged side plan view of the rear suspension of FIG. 1, showing the parallelogram axes;

FIG. 6 is an enlarged and compressed side plan view of the front suspension of FIG. 1, showing the parallelogram axes;

FIG. 7 is a side elevational view of a rear parallelogram suspension system safety bicycle frame, using a single load carrying member, and with a shock/spring sub-assembly unit mounted behind the seat tube; and FIG. 8 is a side elevational view of a front parallelogram suspension system safety bicycle frame, where the frame has a small front triangle with a suspension anchor tube, and the shock/spring sub-assembly unit, while partially hidden, can be seen to connect to the top of the suspension anchor tube and to the bottom of the head tube.

DETAILED DESCRIPTION OF THE INVENTION

Be it stated, that since the parallelogram design concept applies to the design of a bicycle frame only, the Figures of the invention thus described are for a fully suspended safety bicycle frame, some of it's suspension system members and their assemblies, and the invention used as only a rear suspension and only a front suspension, on a safety bicycle frame. None of the Figures show the components of a fully equipped bicycle. References are made to the bicycle components which are not shown, to describe how they could be attached to a bicycle frame that utilizes the parallelogram design concept for suspension systems.

The following guidelines are for the crankset and rear wheel alignment, to the main rear suspension parallelogram, in any rear suspension system that uses the parallelogram design concept. These guidelines will produce the most desired chain line for the least amount of power induced suspension activity and power loss. They are based on the fact that the smaller the chainring and the larger the cog, that are connected at one time through the chain, the greater the drive torque on the rear wheel. These guidelines are such that the highest torque condition has the best chain line and the least suspension activity and power loss:

For common multiple speed bicycles, with multiple chainrings at the crankset and/or multiple cogs at the rear wheel, it would be advantageous to have the chain line, from where the chain leaves the largest commonly used rear wheel cog to where the chain enters the smallest commonly used crankset chainring, parallel to the horizontal suspension arm pivot axes B1 and B2 in FIG. 5;

For a single speed bicycle, or a bicycle that uses an internally geared hub for the rear wheel and only one chainring at the crankset, it would be advantageous to have the chain line, from where the chain leaves the most commonly used rear wheel cog to where the chain enters the most commonly used crankset chainring, parallel to the horizontal suspension arm pivot axes B1 and B2 in FIG. 5;

For a bicycle that uses an internally geared rear hub and multiple chainrings, it would be advantageous to have the chain line, from where the chain leaves the smallest commonly used to rear wheel cog where the chain enters the most commonly used crankset chaining, parallel to the horizontal suspension arm pivot axes B1 and B2 in FIG. 5.

FIGS. 1 through 6 are views of a fully suspended safety bicycle frame that uses a single shock/spring unit, 15, that is a sub-assembly with linkage members 16 and 17. The shock/spring unit, 15, supports both the front and rear suspensions simultaneously. This is the preferred embodiment of the invention.

Figure 2:
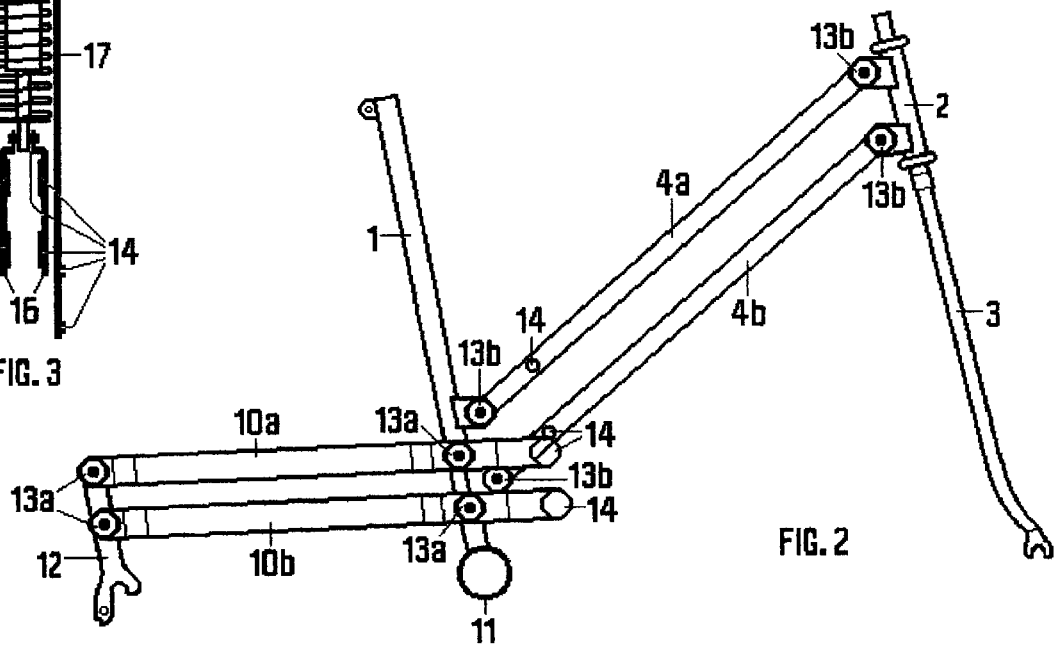
FIG. 2 is the view of FIG. 1 with the shock/spring unit removed.

The rear suspension shown in FIGS. 1, 2, and 5 is designed with the suspension pivots in line with the center of the wheels axle at the dropout, 12, on axis A1, and in line with the center of the bottom bracket, 11, at axis A2. While the best alignment of the rear horizontal axis B3 might not be parallel to the rear suspension axes B1 and B2, as is discussed above, axis B3 is shown parallel to B1 and B2 in these Figures for the simplicity of the illustrations. The rear suspension arm axes, B1 and B2, must be parallel, and the vertical axes, A1 and A2, must be parallel, for proper operation of the rear suspension.

The rear suspension arms, 10a and 10b, are identical. The design envisioned in FIGS. 1, 2, and 5, has the suspensive force equally split onto both rear suspension arms, 10a and 10b. The rear pivot bearings and their locations are marked as 13a and 14 in these Figures. The bearings themselves, that are marked 13a , are envisioned to be cartridge style ball bearing assemblies.

While the rear suspension members, 10a and 10b, could each be made out of two separate halves, one for the right side of the frame and one for the left side of the frame, the preferred embodiment, for the greatest lateral strength and stability, would be a single "H" shaped arm as shown in FIG. 4. All of the fore and aft bearing pivot locations, 13a and 14, on the upper, 10a, and lower, 10b, arms have to be identical to the other arm. The geometric alignment of the rear suspension of FIGS. 1 and 2 is shown in FIG. 5.

The vertical axes A1, A2, and A3 of the rear suspension must be parallel. Axis A1 is for the attachments to the dropout, 12. Axis A2 is for the attachments to the frame at the seat tube, 1, and axis A3 is for the attachments through linkage members 17, to the shockspring unit 15. The connections to the seat tube, 1, could be to frame brackets that are attached to the seat tube, 1. If a shock and/or spring member attached to only one rear suspension arm, 10a or 10b, then the pivotal attachment would only need to be to the respective arm, and axis A3 would not exist. Likewise, if the shock and spring members each attached individually through separate linkages to both suspension arms, 10a, and 10b, then each member's linkage would need to be parallel to axes A1 and A2.

Horizontal axes B1 and B2 must be parallel. Axis B3 could be, but need not be, parallel to axes B1 and B2. The placement of axes B1 and B2 is not as critical as axes A1 and A2 for power absorption characteristics. The closer axes B1 and B2 are to the wheels attachment to dropout, 12, and to the bottom bracket, 11, the stronger and lighter the rear suspension will be.

The best location for axis A1, for the least suspension activity from drive torque, is to place the centers of the bearing pivots, 13a and 14, in line with the wheel axle's center on dropout 12. The best location for axis A2, for the least suspension activity from drive torque, is to place the centers of the bearing pivots, 13a and 14, in line with the center of the bottom bracket, 11. As shown in FIGS. 1, 2 and 5, with axis A2 directly in line with the seat tube, 1, the alignment of axis A1 at the dropout, 12, is tilted to match the angle of the seat tube, 1.

Figure 3:
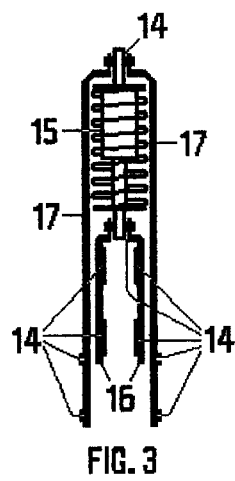
FIG. 3 is a front plan view of the shock/spring sub-assembly unit used in FIG. 1.

The sub-assembly of the shock/spring unit is shown in FIG. 3. Linkage members 16 are identical, as are members 17. The linkage members, 16 and 17, are arranged so the shock/spring unit, 15, is centered over the suspension arms, 4a, 4b, 10a and 10b. Since the sub-assembly in this design is in front of the seat tube, 1, the upper connection of the shock/spring unit, 15, through the two linkage members, 17, applies pressure on extensions of the rear suspension arms, 10a and 10b, that project in front of the seat tube, 1. Since the rear suspension arms, 10a, and 10b, pivot at the seat tube, 1, upward force at axis A3 causes downward force to be applied to the rear wheel at axis A1. The lower connection of the shock/spring unit, 15, goes to the front suspension tubes, 4a and 4b, through the two linkage members 16. The shock/spring sub-assembly unit, which includes linkage members 16 and 17, has bearings placed at the locations marked 14. These bearings allow the linkage arms, 16 and 17, to move in relation to each other, thus allowing the shock/spring unit, 15, to move without binding.

The front suspension of the embodiment shown in FIGS. 1, 2, and 6, is comprised of an upper suspension tube, 4a, and a lower suspension tube, 4b. The front pivot points are directly at the head tube, 2, and the rear pivot points are to brackets at the seat tube, 1. The alignment of the front suspension is shown in FIG. 6. The horizontal axes, D1 and D2, must be parallel, and the vertical axes, C1, C2, and C3, must also be parallel. Axis C1 is where the front suspension attaches to the seat tube, 1, through the brackets seen in FIG. 6. The attachment to the head tube, 2, is at an angle exactly equal to the head tube's angle. This arrangement simplifies and lightens the attachment to the head tube, 2.

In the embodiment shown in FIGS. 1, 2, and 6, the suspensive force is split equally between the upper suspension tube, 4a, and the lower suspension tube, 4b. Linkage members, 16, connect the front suspension tubes, 4a and 4b, to the shock/spring unit, 15. Similar to the rear suspension, if either the shock and/or spring member attached only to one suspension tube, 4a or 4b, then axis C2 would not be needed for that member. Or if the shock and spring members attached separately to both suspension tubes, 4a and 4b, then each member would need an axis C2.

The bearings locations for the front suspension are marked 14 in FIGS. 2 and 6, and the front suspension bearings themselves are marked 13b. Bearings 13b must be able to resist torsional forces when the rider is out of the saddle and performing a high power maneuver. It is envisioned that bearings 13b would be cartridge type roller bearings, it would be possible to have two individual bearing assemblies, one on each side at the pivot points to resist the torsional force, or it would be possible to use another type of bearing that will resist torsional forces, such as a sleeve bearing.

In the embodiment of FIG. 1, a single shock/spring unit, 15, suspends both the front and rear wheels of the bicycle frame. The shock/spring unit could be separated into individual shock and spring members. If the shock and spring were connected separately, each one would need bearings in locations equivalent to those marked 14 in FIG. 3, for proper, unbinding, operation, as was described above. There could also be some adjustability designed into the shock/spring unit, 15, 16 and 17, that would allow it's effective length to be changed, and thus affect the ride height of the suspended bicycle.

While FIG. 1 shows the shock spring unit and it's linkages, 15, 16, and 17, located in front of the seat tube, 1, it could be placed in many various locations that can be imagined by those skilled in the art of bicycle frame construction. It could also connect through rocker or leverage arms, to either or both suspension systems. The location shown in FIG. 1 is the envisioned location for simplicity and light weight and is the preferred embodiment.

All of the bearings, 13a and 13b, and the bearing locations, 14, have to have some means of rigidly fastening the bearings into place. The preferred embodiment of bearings 13a are cartridge ball bearing assemblies. The preferred embodiment of bearings 13b are cartridge roller bearing assemblies. These bearings locations can use any common means of attachment such as snap rings. It is not felt that a press fit would be a good chose, however, for the increased time and complexity of service.

In FIGS. 1, 2, 4 and 5, the connection from the shock/spring unit, 15, through the linkage members, 17, to the rear suspension arms, 10a and 10b, are shown at a fixed distance from the suspension arm pivot locations, 13a and 14, at the seat tube, 1. In a filly suspended safety bicycle frame, it would be possible to design the rear suspension system so this distance would be adjustable. This adjustment would allow the ratio of the shock/spring unit's, 15, suspensive force to be varied between the front and rear suspension systems. Thus allowing a filly suspended bicycle frame with a single shock/spring unit to be further adjusted for different riders, and to allow the front and rear suspension ride heights to be adjusted independently. There are several means that such adjustability could be achieved, through, for example, eccentric rings where the bearings on axis A3 mount to the rear suspension arms, 10a, and 10b, or by having the rear suspension arms telescopically adjustable between axes A2 and A3. The particular means used would be at the discretion of the particular frames designer. There are also various means that this adjustment could be achieved with the front suspension system or with the shock/spring unit linkages. The possibilities are limitless, the idea discussed above for rear suspension adjustment is, in the inventors view, the strongest and most easily accomplished means for such adjustability.

FIG. 7 is a side elevational view of a safety bicycle frame that uses a rear wheel parallelogram suspension system. While this view shows a standard front fork, 3, it would be possible for a frame with only a rear parallelogram suspension to use one of the common telescopically compressing cylinder suspension fork. The front section of the safety bicycle frame in FIG. 7 is of conventional design, with a seat tube, 1, a top tube, 5, a head tube, 2, a down tube, 6, and a bottom bracket 11. FIG. 7 is only one possibility of the use of a parallelogram suspension system on only the rear of a bicycle frame, and is not to be construed to be a limiting factor of a parallelogram suspension system for use on only the rear wheel of a bicycle.

In FIG. 7, only the upper suspension arm, 10a, suspends the weight applied to the rear wheel, and as such, pivotally connects directly to the shock and spring unit, 15, without any linkage members. It is envisioned in this design that the sides of the rear suspension arms, 10a and 10b, connect together right behind the seat tube, 1, and the shock/spring unit, 15, connects to the upper arm, 10a, at this cross connection. Suspension arms 10a and 10b could each be made out of two pieces, one for each side.

The lower rear suspension arm, 10b, in FIG. 7, functions to keep the rear suspension aligned in a parallelogram and acts as a leverage arm for the bicycle's drive train. The shock/spring unit, 15, connects to the upper control arm, 10a, and the seat tube, 1, through two bearing assemblies at locations 14. Since the bearings are inside the brackets at the locations marked 14, they are not visible. It would be possible to connect the shock and spring unit, 15, to both rear suspension arms, 10a and 10b, through linkage members similar to the system in FIG. 1, or to only the lower suspension arm 10b. It is also possible that the shock/spring unit could be separate shock and spring members, each connecting separately to the suspension. Another possible configuration would be to have the shock/spring unit in front of the seat tube, 1. If the shock/spring unit connects through linkage members to both suspension arms, 10a and 10b, the linkage members would have to attach to the two arms in such a way that the attachment pivots are parallel to where the suspension arms, 10a, and 10b, attach to the seat tube, 1, and to the rear dropout, 12, that is parallel to axes A1 and A2 in FIG. 5.

FIG. 8 is a side elevational view of a safety bicycle frame that uses a front parallelogram suspension system. This frame is based on the concept that the frame has a small main triangle, 1, 5, and 6, that ends at a suspension anchor tube, 7, to which the suspension system is attached. The rear section of this frame is of conventional construction, with a seat tube, 1, seat stays, 8, chain stays, 9, and rear dropouts, 18 (there are two each of the seat stays, chain stays and dropouts, as in a conventional design, but in the view of FIG. 8 only one of each can be seen). In this design the front suspension tubes, 4a and 4b, are short. This style of front suspension system would not have the range of travel of the front suspension in FIG. 1. In FIG. 8, the shock/spring assembly, 15, is one unit, and attaches from the top of the suspension anchor tube, 7, to the bottom of the head tube, 2. Other placements and arrangements of the shock/spring unit are possible.

In the frame shown in FIG. 8, the top tube, 5, and down tube, 6, end at the suspension anchor tube, 7, instead of the head tube, 2, as in a conventional frame. The suspension anchor tube, 7, is attached so it is parallel to the head tube, 2. The front fork, 3, is attached to the head tube, 2, in conventional means. With the suspension anchor tube, 7, parallel to the head tube, 2, the front suspension systems arrangement is simplified, and is kept to the lowest possible weight. It would be possible to connect the front suspension arms to the seat tube, 1, instead of an anchor tube, 7, in which case a small front triangle would not be needed. The shock/spring unit could also be separate shock and spring members, and could attach in a plurality of means to either one or both of the suspension arms. If the shock/spring unit attached to both suspension arms, the attachment location to each arm would have to be parallel to the arms attachment to the main frame of the bicycle and the head tube, similar to the front suspension system of Figure's 1, 2, and 6.

The front parallelogram suspension system of FIG. 7 is comprised of three members. These are the two suspension tubes, 4a and 4b, and the shock/spring unit 15. The two suspension tubes, 4a and 4b, could be of dissimilar construction and/or shape, but the bearing locations, 13b, must be arranged so the bearing center points form a parallelogram. The shock/spring unit, 15, is attached to the main body of the bicycle frame at the suspension anchor tube, 7, and to the front wheel through the head tube, 2, and provides an upward force on the frame and a downward force on the front wheel. The bearings used in a front parallelogram suspension system, 13b, would have to resist torsional forces, the envisioned style of bearing would be a cartridge bearing assembly with roller bearings, but may other bearings, such as two individual ball bearing assemblies, one on each side at locations marked 13b, or a sleeve bearing, could be used.

It should be noted at this time that it would be possible to construct a fully suspended bicycle frame using individual parallelogram suspension systems, similar to those shown in FIGS. 7 and 8 and described above.

What I claim is:

1. A fully suspended human powered bicycle frame comprising:

a nearly vertical seat tube, where the seat attaches to the top thereof, and a bottom bracket attached to the bottom thereof, with;

an upper rear suspension arm and a lower rear suspension arm, that are each located on a nearly horizontal plane, thus giving said suspension arms a forward end and a rearward end, and said suspension arms can each be a single unit or comprised of a left half and a right half, with;

two rear dropout members, to which the rear wheel attaches to the said rear suspension arms, with one dropout member on the left side of the frame and one dropout member on the right side of the frame, with;

the rearward ends of said rear suspension arms being pivotally connected to the said dropout members at incrementally spaced locations thereof, with these locations being exactly the same on each said dropout member, thus making the axis between the upper said rear suspension arm dropout pivot points parallel to the axis between the lower said rear suspension arms dropout pivot points, and;

the forward section of said rear suspension arms being pivotally connected to either said seat tube, or brackets attached thereto, at incrementally spaced locations thereof, with the pivots located at either the extreme forward ends of said rear suspension arms, or points intermediately between the forward and rearward ends of each said rear suspension arm, with;

the incremental distance on said upper rear suspension arm from the rearward dropout pivot axis to the forward seat tube pivot axis being exactly the same as the incremental distance on said lower rear suspension arm from the rearward dropout pivot axis to the forward seat tube pivot axis, with;

the incremental distance between the upper pivot axis and lower pivot axis on said seat tube, being exactly the same as, the incremental distance between the upper pivot axis and lower pivot axis on said dropouts, which;

results in the locations of the four rear suspension pivot axes, two axes on said upper rear suspension arm and two axes on said lower rear suspension arm, thusly arranged in a polygon that comprises a first parallelogram, and;

an upper front suspension tube and a lower front suspension tube, that are each located on a nearly horizontal plane, thus giving each said suspension tube a forward end and a rearward end, with;

the forward end of said front suspension tubes being pivotally connected to either a head tube of conventional design, or to brackets attached thereto, at incrementally spaced locations thereof, with;

the rearward section of said front suspension tubes being pivotally connected to either the said seat tube or to brackets attached thereto, at incrementally spaced locations thereof, or, being pivotally connected to a frame assembly, that is structurally connected to said seat tube, at incrementally spaced locations thereof, with;

the rearward pivots of said front suspension tubes being located at either the rearward end of the said suspension tubes, or points intermediately between the forward and rearward ends thereof, with;

the incremental distance on said upper front suspension tube from the forward head tube pivot axis to the rearward pivot axis being exactly the same as the incremental distance on said lower front suspension tube from the forward head tube pivot axis to the rearward pivot axis, with;

the incremental distance between the upper pivot axis and lower pivot axis on said head tube being exactly the same as the incremental distance between the upper pivot axis and lower pivot axis on said rearward attachment to either the seat tube or the frame assembly, which;

results in the locations of the four front suspension pivot axes, two axes on said upper front suspension tube and two axes on said lower front suspension tube, thusly arranged in a polygon that comprises a second parallelogram, with;

a shock member that is pivotally connected to said rear parallelogram suspension system, and a shock unit that is pivotally connected to said front parallelogram suspension system, and each said suspension system can use individual shock members that are connected from each individual suspension system to the main frame of the bicycle, or the two said suspension systems could share opposite ends of a single shock member, and;

any said shock member configuration could attach either directly, or through a plurality of linkages, to either one or both of said suspension systems and/or the bicycle frame, and;

a spring member that is pivotally connected to said rear parallelogram suspension system, and a spring member that is pivotally connected to said front parallelogram suspension system, and each suspension system could use individual said spring units that are connected between each suspension system and the main frame of the bicycle, or the two said suspension systems could share opposite ends of a single spring member, and;

any said spring member configuration could attach either directly, or through a plurality of linkages, to either one or both of said suspension systems, and/or the bicycle frame, and;

the said shock and spring members, for any possible configuration thusly described, could attach to their respective said suspension systems individually, or they could be combined into a sub-assembly unit, with the sub-assembly pivotally connecting the respective suspension system to the main frame of the bicycle, or connecting to both said suspension systems in such a fashion as to provide shock absorption and lift to the main frame of the bicycle, and;

the said shock and spring members can pivotally attach to either an individual or to both said rear suspension arms, in such a fashion that if the connections are to both said rear suspension arms, through a plurality of linkages, the axis of the pivot points of the linkages is parallel to the axis of the upper and lower said seat tube pivot axis and the upper and lower said dropout pivot axis, and;

the said shock and spring members can pivotally attach to either an individual, or to both, said front suspension tubes in such a fashion, that if the connections are to both said front suspension tubes, through a plurality of linkages, the axis of the pivot points of the linkages is parallel to the axis of the upper and lower said head tube pivot axis and the upper and lower said main frame pivot axis, to the said suspension tubes.

2. A human powered bicycle frame with a rear suspension system comprising:

a bicycle frame consisting of a conventional main triangle with a seat tube, top tube, head tube, down tube, and bottom bracket, arranged in such a fashion that the seat attaches to the top of the seat tube, the top tube connects the top of the seat tube to the top of the head tube, the head tube provides an anchor for the front forks, the down tube connects the bottom of the head tube to the bottom bracket, and the bottom bracket connects the bottom of the down tube to the seat tube and provides an anchor for the crankset, and;

an upper rear suspension arm and a lower rear suspension arm, that are each located on a nearly horizontal plane, thus giving said suspension arms a forward end and a rearward end, and said suspension arms can each be a single unit or comprised of a left half and a right half, with;

two rear dropout members, to which the rear wheel attaches to said rear suspension arms, with one dropout member on the left side of the frame and one dropout member on the right side of the frame, with;

the rearward ends of said suspension arms being pivotally connected to said dropout members at incrementally spaced locations thereof, with these locations being exactly the same on each said dropout member, thus making the axis between the upper said suspension arm dropout connection points parallel to the axis between the lower said suspension arm dropout connection points, and;

the forward section of said suspension arms being pivotally connected to either said seat tube or brackets attached thereto, at incrementally spaced locations thereof, with the pivots located at either the extreme forward ends of said suspension arms, or points intermediately between the forward and rearward ends of said suspension arms, with;

the incremental distance on the upper said suspension arm from the rearward dropout pivot axis to the forward seat tube pivot axis being exactly the same as, the incremental distance on the lower said suspension arm from the rearward dropout pivot axis to the forward seat tube pivot axis, with;

the incremental distance between the upper pivot axis and lower pivot axis on said seat tube, being exactly the same as, the incremental distance between the upper pivot axis and lower pivot axis on said dropouts, which;

results in the locations of the four rear suspension pivot axes, two axes on the upper said suspension arm and two axes on the lower said suspension arm, thusly arranged in a polygon that comprises a parallelogram, and;

a shock member that is pivotally attached to said rear parallelogram suspension system at one end and that is pivotally attached to the main frame of the bicycle at the other end, and;

the said shock member could attach either directly or through a plurality of linkages at either end, and;

a spring member that is pivotally attached to said rear parallelogram suspension system at one end and that is pivotally attached to the main frame of the bicycle on the other end, and;

the said spring member could attach either directly or through a plurality of linkages at either end, and;

the said shock and spring members, for any possible configuration thusly described, could attach to the rear suspension system individually or they could be combined into a sub-assembly unit, with the sub-assembly unit pivotally connecting to the rear suspension system in such a fashion as to provide shock absorption and lift to the main frame of the bicycle.

3. A human powered bicycle frame with a front suspension system comprising:

a conventional rear triangle with a nearly vertical seat tube, two seat stays, two dropouts, two chain stays and a bottom bracket, arranged in such a fashion that the seat attaches to the top of the seat tube, the two seat stays each connect from the top of the seat tube to the two dropouts such that there is a seat stay and dropout on the left side of the bicycle frame and a seat stay and dropout on the right side of the bicycle frame, the two chain stays connecting from the two dropouts to the bottom bracket with one on each side of the frame, and the bottom bracket connects the bottom of the seat tube to the two chain stays and provides an anchor for the crankset, and;

an upper front suspension tube and a lower front suspension tube, that are each located on a nearly horizontal plane, thus giving each said suspension tube a forward end and a rearward end, with;

the forward end of said front suspension tubes being pivotally connected to a head tube of conventional design, or to brackets attached thereto, at incrementally spaced locations thereof, with;

the rearward end of said front suspension tubes being pivotally connected to said seat tube or to brackets attached thereto, at incrementally spaced locations thereof, or, being pivotally connected to a frame assembly that is structurally connected to said seat tube, at incrementally spaced locations on a suspension anchor tube at the front of said frame assembly, with;

the rearward pivots of said front suspension tubes being located at either the rearward end of the said suspension tubes, or points intermediately between the forward and rearward ends thereof, with;

the incremental distance on said upper front suspension tube from the forward head tube pivot axis to the rearward pivot axis being exactly the same as the incremental distance on said lower front suspension tube from the forward head tube pivot axis to the rearward pivot axis, with;

the incremental distance between the upper pivot axis and lower pivot axis on said head tube being exactly the same as the incremental distance between the upper pivot axis and lower pivot axis at the suspensions attachment to either the seat tube or the suspension anchor tube, which;

results in the locations of the four front suspension pivot axes, the two axes on said upper front suspension tube, and the two axes on said lower front suspension tube, thusly arranged in a polygon that comprises a parallelogram, with;

a shock member that is pivotally attached at both ends to said front suspension system, or that pivotally attaches to the head tube at one end and pivotally attaches to said front suspension system at the other, or that pivotally attaches to said front suspension system at one end and pivotally attaches to the main frame of the bicycle at the other, with any possible connection thusly described being either direct or through a plurality of linkages, which results in the absorption of shock from the front wheel into the main frame of the bicycle, and;

a spring member that is pivotally attached at both ends to said front suspension system, or that pivotally attaches to the head tube at one end and pivotally attaches to said front suspension system at the other, or that pivotally attaches to said front suspension system at one end and pivotally attaches to the main frame of the bicycle at the other, with any possible connection thusly described being either direct or through a plurality of linkages, which results in an upward lift on the main frame of the bicycle and a downward force on the front wheel, and;

the said shock and spring members could attach to the front suspension system individually, or they could be combined into a sub-assembly unit, with the sub-assembly unit pivotally connecting into the front suspension system, in any such fashion thusly described, so as to provide shock absorption and lift to the main frame of the bicycle.

* * * * *